United States Patent [19]

Margetts

[11] 4,223,954
[45] Sep. 23, 1980

[54] CONTROL VALVE ASSEMBLIES FOR HYDRAULIC BRAKING SYSTEMS

[75] Inventor: Hugh G. Margetts, Leamington Spa, England

[73] Assignee: Girling Limited, Birmingham, England

[21] Appl. No.: 909,471

[22] Filed: May 25, 1978

[30] Foreign Application Priority Data

May 25, 1977 [GB] United Kingdom ............... 21957/77
Aug. 23, 1977 [GB] United Kingdom ............... 35203/77

[51] Int. Cl.$^2$ ........................................... B60T 15/06
[52] U.S. Cl. .................................... 303/6 A; 188/354; 303/52
[58] Field of Search .................... 60/550, 560, 581; 303/6 A, 6 R, 52; 188/354, 16, 358, 359; 244/50

[56] References Cited

U.S. PATENT DOCUMENTS

| | | | |
|---|---|---|---|
| 3,239,034 | 3/1966 | Wilson | 188/354 |
| 3,900,229 | 8/1975 | Husted | 303/52 |

Primary Examiner—Douglas C. Butler
Attorney, Agent, or Firm—Scrivener, Parker, Scrivener and Clarke

[57] ABSTRACT

In a control valve assembly for vehicle hydraulic braking systems pressurization of a distributor chamber in a housing is controlled by a valve operating mechanism. The valve operating mechanism comprises a piston working in the distributor chamber, a recuperation port in the wall of the housing for connection to a reservoir for fluid and communicating with the chamber on one side of the piston, an axial bore through the piston providing communication between the recuperation port and an inlet passage for connection to a source of high pressure fluid, an axially movable valve member for alternate engagement with first and second axially spaced seatings, the first seating comprising a seating surrounding the opening in the piston and the second seating leading to the inlet passage, and a spring for urging the valve member normally into engagement with the second seating with the valve member spaced from the first seating.

4 Claims, 3 Drawing Figures

CONTROL VALVE ASSEMBLIES FOR HYDRAULIC BRAKING SYSTEMS

SPECIFIC DESCRIPTION

This invention relates to improvements in control valve assemblies for vehicle dual hydraulic braking systems of the kind in which separate brake-applying valves in a common housing are operable independently or simultaneously to cause hydraulic fluid from a distributor chamber in the housing to be supplied to one or both of a pair of outlets for connection to brakes on wheels on opposite sides of a vehicle.

The brake-applying valves can be operated simultaneously for retarding the vehicle or separately for steering.

Known control valve assemblies of the kind set forth are usually operated by a yoke comprising a one-piece member which is pivotally connected at substantially the mid-point in its length to operating mechanism for a valve means for controlling presurisation of the distributor chamber and, at opposite ends, is coupled to different pedals, the yoke also being provided with spaced abutments for operating the brake-applying valves. When both pedals are operated simultaneously the yoke is moved bodily away from the housing to withdraw and operate the mechanism for the valve means and allow both brake-applying valves to open so that pressure fluid in the distributor chamber is supplied to both outlets. When one pedal is operated on its own, initially the yoke pivots about the pivotal connection with the valve-operating mechanism with the abutment for the brake-applying valve corresponding to the pedal moving away from the said brake-applying valve which can open and the other abutment closing the other brake-applying valve. Further movement of that pedal in the same direction acts through the yoke to increase the closing force applied to the said other brake-applying valve, and withdraws the valve-operating mechanism from the housing to pressurise the distributor chamber from which pressurised fluid is supplied through the open brake-applying valve to the brakes on that side of the vehicle. When the valve means comprises a normally-closed inlet valve and a normally-open reservoir valve which are interdependent, withdrawal of the mechanism by the yoke applies pull to the reservoir valve which, after closure, is transmitted to the inlet valve. Since a "pull" is applied to the reservoir valve a certain amount of lost-motion may be present in the connection between the yoke and the reservoir valve. This has first to be taken up before the reservoir valve can be operated in response to operation of at least one pedal and, depending upon the degree of lost-motion present, operation of the reservoir valve may be delayed.

According to our invention in a control valve assembly of the kind set forth a valve-operating mechanism for controlling pressurisation of the distributor chamber comprises a piston working in the distributor chamber, a recuperation port in the wall of the housing for connection to a reservoir for fluid and communicating with the chamber on one side of the piston, an axial bore through the piston providing communication between the recuperation port and an inlet passage for connection to a source of high pressure fluid, an axially movable valve member for alternate engagement with first and second axially spaced seatings, the first seating comprising a seating surrounding the opening in the piston and the second seating leading to said inlet passage, and a spring for urging the valve member normally into engagement with the second seating with the valve member spaced from the first seating, initial axial movement of the piston in response to a inwardly directed valve-operating force urging the first seating into engagement with the valve member to isolate the distributor chamber from the recuperation port, and subsequent movement of the piston in the same direction displacing the valve member away from the second seating whereby pressure fluid from the inlet passage is admitted to the distributor chamber.

Operating the piston with an inwardly directed force or "push" ensures that the valve mechanism is operated positively and substantially no delay occurs in taking-up lost-motion.

The piston is advanced in the housing by means of an operating rod which is guided to slide in the housing and on which a pedal-operated brake-applying mechanism can act directly.

Preferably the valve member has an enlarged head for engagement with the second seating, and the head also forms an abutment for the spring.

One embodiment of our invention is illustrated in the accompanying drawings in which.

Figure 1:
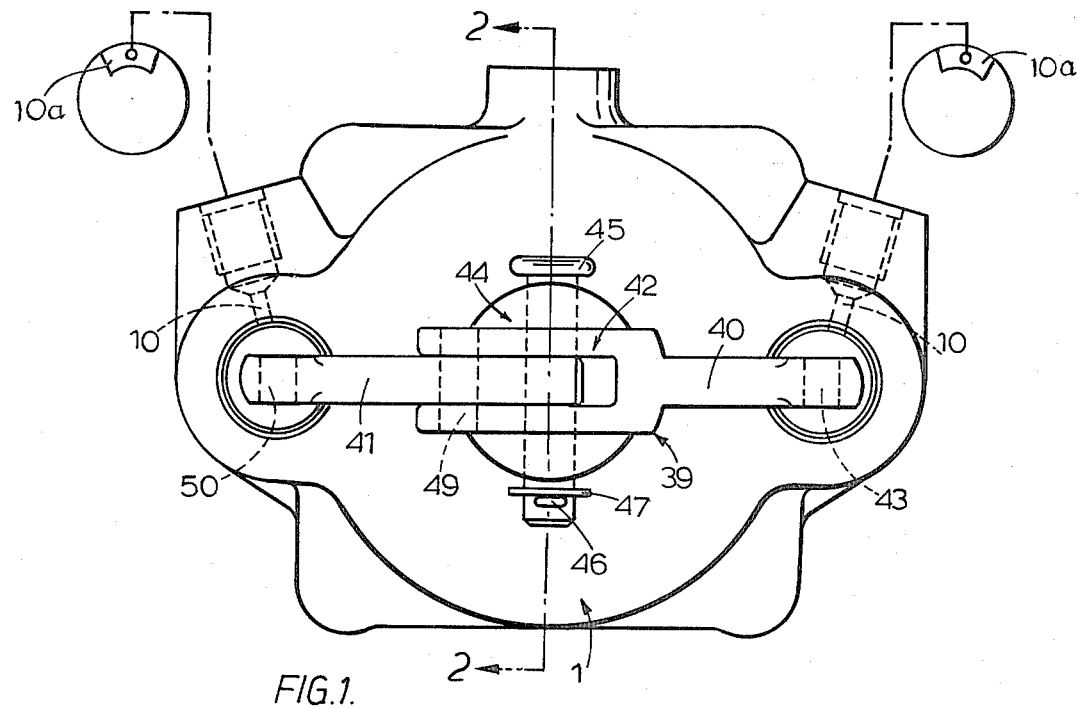
FIG. 1 is an end elevation of a control valve assembly for a vehicle hydraulic braking system.
Figure 2:
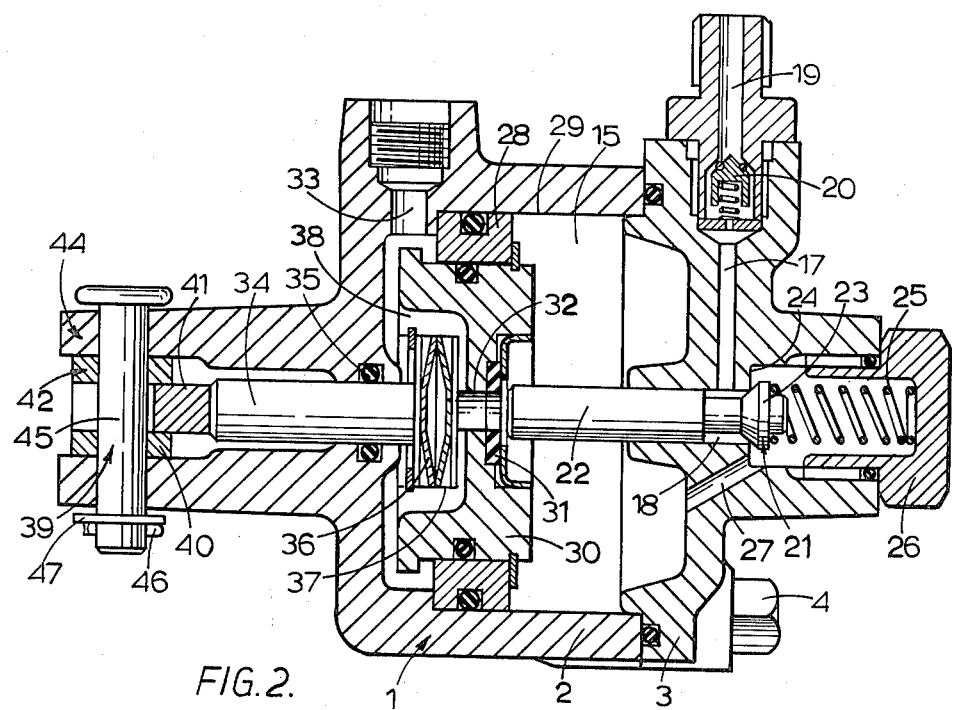
FIG. 2 is a longitudinal section through the valve assembly on the line 2—2 of FIG. 1.
Figure 3:
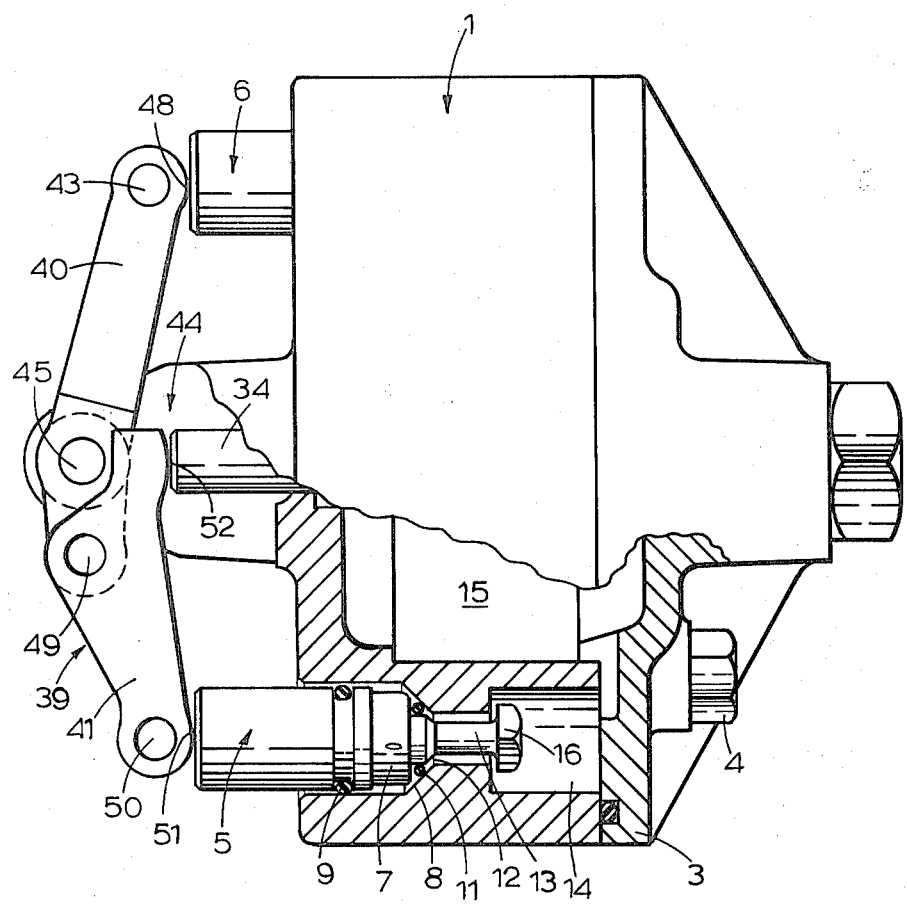
FIG. 3 is a plan containing a section through one of the brake-applying valves.

The control valve assembly shown in the drawings comprises a housing 1 comprising a body 2 of cup-shaped outline, and a closure plate 3 which is clamped against a face at the open end of the body 2 by means of bolts 4.

A pair of brake applying valves 5 and 6 are mounted in the body 2, and each valve 5, 6 comprises a spool 7 which works in a bore 8 and projects at its outer end from the body 2. Each spool 7 carries a radial seal 9 which seals with a portion of the bore on the axially outer side of a radial outlet passage 10, and the passages 10 are connected to brakes 10a on opposite sides of the vehicle. The spool 7 has an inner end portion of reduced diameter carrying a seal 11 for engagement with a seating 12 defined by a complementary radial face at the inner end of the bore 8. The inner end of each spool 7 carries an axial extension 13 which projects into a passage 14 which leads into a distributor chamber 15 defined by a cylindrical chamber in the body 2 which is closed by the plate 3. The free end of the extension 13 carries an enlarged head 16 forming a stop to limit movement of the spool 7 in an outward direction.

The plate 3 includes a radial inlet passage 17 which connects a bore 18 at the centre of the plate 3 with a union 19 for connection to a high pressure pump through a one-way valve 20 which is housed in the inner end of the union 19.

Communication between the inlet passage 17 and the distributor chamber 15 is controlled by a pressure control valve 21. The control valve 21 comprises a plunger 22 which is guided to slide in the bore 18 and has an enlarged valve head 23 which is normally urged into a closed position in engagement with a complementary seating 24 in the plate 3 by means of a compression spring 25. The compression spring 25 is in abutment with a hollow closure member 26 for sealingly closing the outer end of the bore 18, and the interior of the closure member is connected to the chamber 15 through an inclined passage 27.

A first annular outer piston 28 of substantial diameter works in the cylindrical bore 29 of the body 2 and a second annular inner portion 30 is mounted in the first piston 28 for relative sliding movement in a sealing manner through a limited distance. Both pistons 28 and 30 are normally located adjacent to the end of the bore 29 which is remote from the plate 3 and, in this position, the free end of the plunger 22 is spaced from a seating 31 surrounding the central opening 32, in the piston 30. The plunger 22 and the seating 31 define a recuperation valve which is open when the valve assembly is in an inoperative position so that the chamber 15 is in free communication with a passage 33 on the opposite side of the pistons 28 and 30 for connection to a reservoir for hydraulic fluid for supplying the pump.

An operating-rod 34 projects into the bore 29 through a seal 35 in the adjacent closed end of the body 2 and acts on the inner piston 30 through an assembly 36 of Belleville or similar resilient washers which are housed in a recess 37 in the piston 30. The recess 37 is formed with a series of circumferentially spaced flutes or ribs 38 which maintain communication between opposite sides of the piston 30 through the opening 32 and, at their inner ends, locate the Belleville washers in position.

Operation of a valve means comprising the recuperation valve and the pressure control valve 21, and the brake-applying valves 5 and 6 is controlled by a lever mechanism 39 which, in turn, is responsive to operation of a pair of pedals (not shown).

As illustrated the lever mechanism comprises a first lever 40 and a second lever 41. The first lever 40 has a bifurcated inner end portion 42 and is coupled at its outer end to one of the pedals by a pivotal connection 43. At an intermediate point in its length the bifurcated portion 42 is received within a bifurcated portion 44 at the end of the body 2 in which it is pivotally mounted for movement, about a headed transverse pivot pin 45. The pin 45 is passed through aligned openings in the limbs of the bifurcated portions 42 and 44 and is retained in position by a split pin 46 and washer 47. The outer end of the first lever 40 also defines an abutment 48 normally acting on the free end of the spool of the brake-applying valve 6. The free inner end of the first lever 40 at the outer end of the bifurcated portion 42 is connected to an intermediate point in the length of the second lever 41 which it receives by means of a pivotal connection 49. The outer end of the second lever 41 is coupled through a pivotal connection 50 to the other of the pedals and that end defines an abutment 51 normally acting on the free end of the spool 7 of the brake-applying valve 5. The free inner end of the second lever 41 lies inside the pivot pin 45 and is shaped to provide a curved operating face 52 for sliding engagement with the free outer end of the operating rod 34.

In the inoperative position shown in which both the brake-applying valves 5 and 6, and the pressure control valve 21 are closed, the recuperation valve is open so that both the distributor chamber 15 and the brakes are in communication with the reservoir.

When the brakes on opposite sides of the vehicle are to be applied simultaneously for vehicle retardation both pedals are operated simultaneously to move the outer ends of the levers 40 and 41 away from the body 2 with the first lever pivoting about the pivotal connection 45, and the second lever pivoting about the pivotal connection 49 with the first lever. The abutments 48 and 51 are thus moved away from the brake-applying valves 5 and 6 to ensure that they are fully open, and the operating face 52 moves relatively towards the body 2 to apply an axially directed force to the free end of the operating rod 34. This moves the rod 34 into the body 2 acting through the Belleville washer 36 to advance the inner piston 30 with respect to the outer piston 28 until the valve seating engages with the free end of the plunger 22. This closes the recuperation valve to isolate the chamber 15 from the reservoir. Further movement of the rod 34 in the same direction is then transmitted through the seating 31 to the plunger 22 which urges the head 23 away from the seating 24 so that fluid from the pump is admitted to the chamber 15 whence it passes to the wheel brakes through the open brake-applying valves 5 and 6. Under these conditions both levers act as levers of the "first order".

By providing a common chamber 15 the pressure supplied to both sets of brakes is equalised to avoid differential wear of the linings.

When the brakes on one side of the vehicle are to be applied for steering, say those applied by the valve 5, the pedal coupled to the connection 50 is operated to move the second lever 41 angularly about the pivotal connection 49. This causes the operating face 52 to actuate the valve means to pressurise the chamber 15 as described above. Simultaneously or slightly before, the reaction on the pivotal connection 49 moves the first lever angularly about the connection 45 to urge the abutment 48 into engagement with the spool of the valve 6, moving same inwardly to close the valve and prevent fluid from the chamber 15 passing through the outlet from that valve, as it is free to do through the other, open, valve.

When the brakes on the other side of the vehicle are to be applied the other pedal is operated on its own to move the first lever 40 angularly about the fixed pivotal connection 45 and the load transmitted to the second lever 41 through the pivot 49 causes the operating face 52 on second lever 41 to operate the valve means as described above and for the abutment 51 to act to close the brake-applying valve 5.

When the other pedal is operated on its own, the first lever acts as a lever of the "first order" but the second lever acts as a lever of the second order.

The distributor chamber and the bore 29 on both sides of the piston 28 and 30 are normally filled with fluid at atmospheric pressure in the inoperative position. Since the one-way valve 20 prevents a reverse flow of fluid to the pump, should the pump fail, the brakes can still be applied by pressurisation of the volume of fluid trapped in the bore 29 after the recuperation valve has closed and upon further movement of the piston 30 accompanied by the piston 28, irrespective of whether the pedals are operated simultaneously or independently.

I claim:

1. A control valve assembly for a vehicle dual hydraulic braking system comprising a housing provided with a distributor chamber, and first and second outlet ports for connection to brakes on wheels on opposite sides of said vehicle, separate brake-applying valves in said housing operable independently and simultaneously to cause fluid in said chamber to be supplied to one of said outlet ports and both of said outlet ports respectively, and a valve operating mechanism for controlling pressurisation of said distributor chamber, said valve operating mechanism comprising a piston working in said distributor chamber, a recuperation port in a wall of said housing for connection to a reservoir for fluid and communicating with said chamber on one side of said piston, an axial bore through said piston providing communication between said recuperation port and an inlet passage for connection to a source of high pressure fluid, first and second axially spaced seatings, an axially movable valve member for alternate engagement with said first and second axially spaced seatings, said first seating comprising a seating surrounding said bore in said piston and said second seating leading to said inlet passage, said axially movable valve member having a first end defining a face for engagement with one of said seatings and a second opposite end carrying a head for engagement with the other of said seatings, and a spring for urging said valve member normally into engagement with said second seating with said valve member spaced from said first seating, initial axial movement of said piston in response to an inwardly directed valve-operating force urging said first seating into engagement with said valve member to isolate said distributor chamber from said recuperation port, and subsequent movement of said piston in the same direction displacing said valve member away from said second seating whereby pressure fluid from said inlet passage is admitted to said distributor chamber.

2. A control valve assembly as claimed in claim 1, wherein an operating-rod is guided to slide in said housing upon which a pedal-operated brake-applying mechanism can act directly.

3. A control valve assembly as claimed in claim 2, wherein the operating-rod acts on the piston through an assembly of resilient washers which are housed in a recess in said piston, and said recess is formed with a series of circumferentially spaced flutes which maintain communication between opposite sides of said piston through said bore and at their inner ends locate said washers in position.

4. A control valve assembly as claimed in claim 1, wherein said valve member has an enlarged head for engagement with said second seating, and said head also forms an abutment for said spring.

* * * * *